Figure 1:
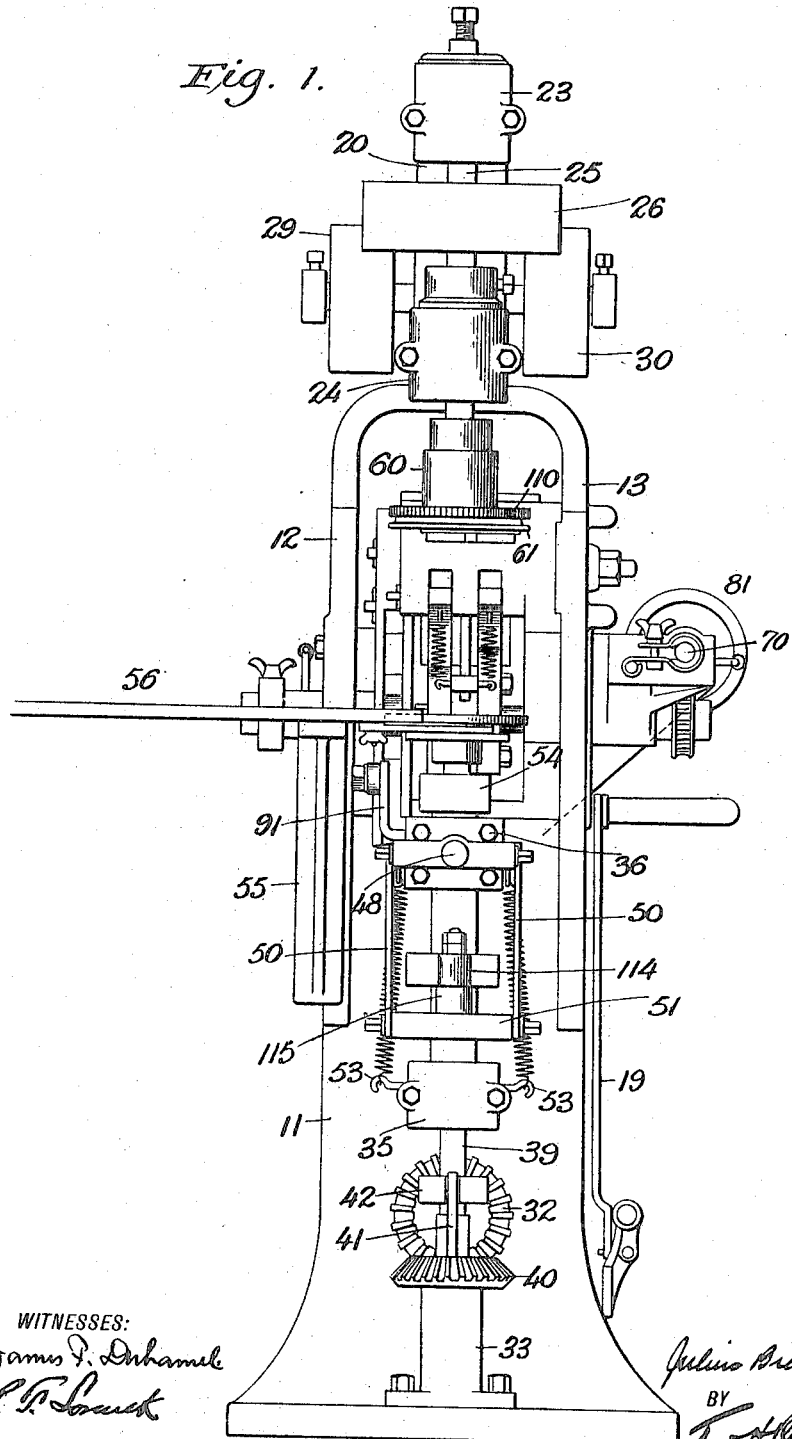

J. BRENZINGER.
CAN HEADING MACHINE.
APPLICATION FILED FEB. 15, 1908.

1,202,476.

Patented Oct. 24, 1916.
6 SHEETS—SHEET 4.

WITNESSES:

INVENTOR
Julius Brenzinger
BY
Fred H Bowersock
ATTORNEY

J. BRENZINGER.
CAN HEADING MACHINE.
APPLICATION FILED FEB. 15, 1908.

1,202,476.

Patented Oct. 24, 1916.
6 SHEETS—SHEET 6.

WITNESSES:
James F. Duhamel
P. Horuck

INVENTOR
Julius Brenzinger
BY
Frost Bowesen
ATTORNEY

UNITED STATES PATENT OFFICE.

JULIUS BRENZINGER, OF MOUNT VERNON, NEW YORK, ASSIGNOR TO MAX AMS MACHINE COMPANY, OF MOUNT VERNON, NEW YORK, A CORPORATION OF NEW YORK.

CAN-HEADING MACHINE.

1,202,476. Specification of Letters Patent. Patented Oct. 24, 1916.

Application filed February 15, 1908. Serial No. 416,001.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to machines for securing the heads to the body portions of sheet-metal containers, commonly known as tin cans, by what is known as the double-seaming process. As is well known this process comprises the steps of flanging the end edge of the can body, superposing the edge of the top or end portion upon said flange, and then rolling or intercurling and finally compressing these two superposed layers of metal together to form a bead which provides a rigid joint and air-tight seal.

This invention contemplates a machine for thus closing and sealing the common cylindrical or so-called "round" can. Heretofore, in machines of this character, a can with its top or cover loosely placed thereon is delivered to a rotatable platform in proper position, which platform is then raised to bring the central depression with which the can-top is provided into engagement with a chuck of configuration corresponding to said depression. This chuck forms the abutment or track against which the seaming rollers act during operation of the latter to effect the double seam. These rollers are usually provided with bearings which are fixed during effective operation thereof, the can-body being rotated for the seaming operation by friction between the positively rotated chuck and the can-cover which is rigidly held between said chuck and the rotatable platform. It has been found that such a construction interferes with rapid operation, inasmuch as there must necessarily be considerable lost motion before the can-body with the top thereon is gripped with sufficient force to be positively rotated, and, because the resistance of the rollers when applied to the edges to be seamed, will frequently overcome the friction by which the can-body is rotated and cause the can to slip, thus unnecessarily prolonging the duration of the seaming operation. Furthermore, when the seaming operation has been completed, the momentum of the moving parts, which must be brought to rest for the removal of the seamed can and the positioning of the next succeeding can to be seamed, will, in the absence of suitable braking mechanism, delay each seaming operation and thus seriously curtail the capacity of the machine. Furthermore, the seaming rollers, which must be mounted in movable bearings whereby the same can be intermittently and alternately brought into coöperative positional relation to the chuck, have heretofore been most commonly mounted at one side of the machine, in which position they seriously interfere with the provision of devices for delivering the assembled but unseamed can parts to the seaming mechanism and ejecting the closed and sealed can therefrom. Heretofore, also, these seaming rollers have not been positively driven, their function being merely that of idlers which are rotated through the frictional contact with the rotating can-body, and this tends to delay effective coöperative action through the forces wasted in overcoming the inertia of the rollers augmented by the pressure under which they are applied to the edges to be seamed.

The objects of the present invention are, first, to provide means for positively driving the can-supporting platform and insuring the same velocity and direction of rotation as the positively rotated chuck; second, to provide an improved supporting frame for the moving parts of the machine and to locate the seaming rollers and their actuating mechanisms in said frame at the rear of the machine and therefore non-interferent with the delivering and ejecting mechanism; third, to provide simple and effective automatic braking means, through the employment of which the platform which is rotated during the seaming operation may be quickly but steadily brought to a position of rest immediately upon the termination of said seaming operation, whereby the seamed can may be quickly removed therefrom and another unseamed can immediately placed thereon for the next succeeding operation; and, fourth, to provide means for positively rotating the seaming rollers during their effective operation, and this at a rate of speed which insures pure rolling contact between each roller and the chuck.

Incidental to the above, this invention contemplates other improvements with a view to providing a machine of this character which will be simple in construction, more positive and dependable in operation, requiring a minimum of driving power, and to the largest possible extent automatic, whereby the same may be satisfactorily operated by a comparatively unskilled attendant.

My invention will be more readily understood by reference to the accompanying drawings, forming a part of this specification, in which—

Figure 2:
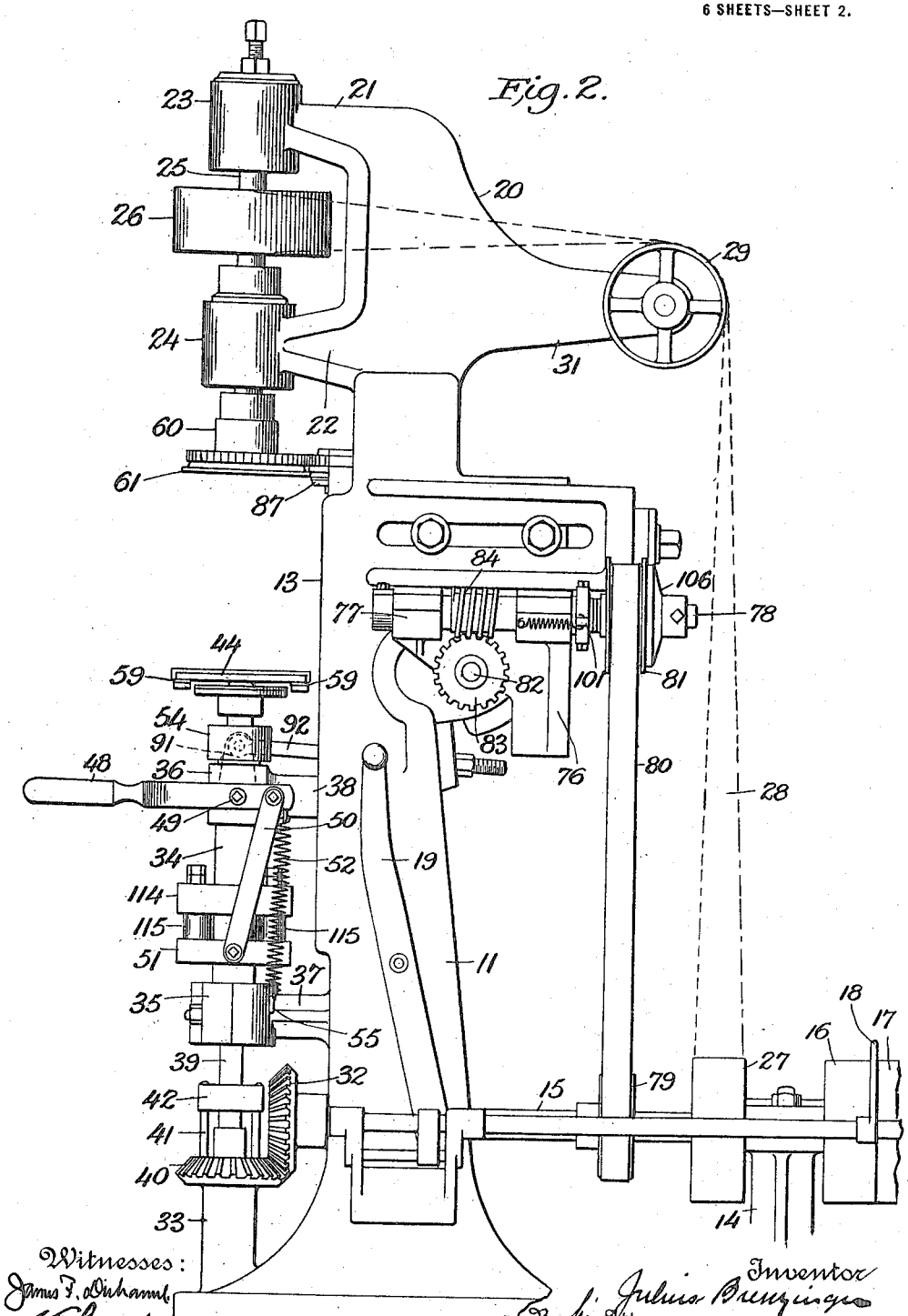
Figure 3:
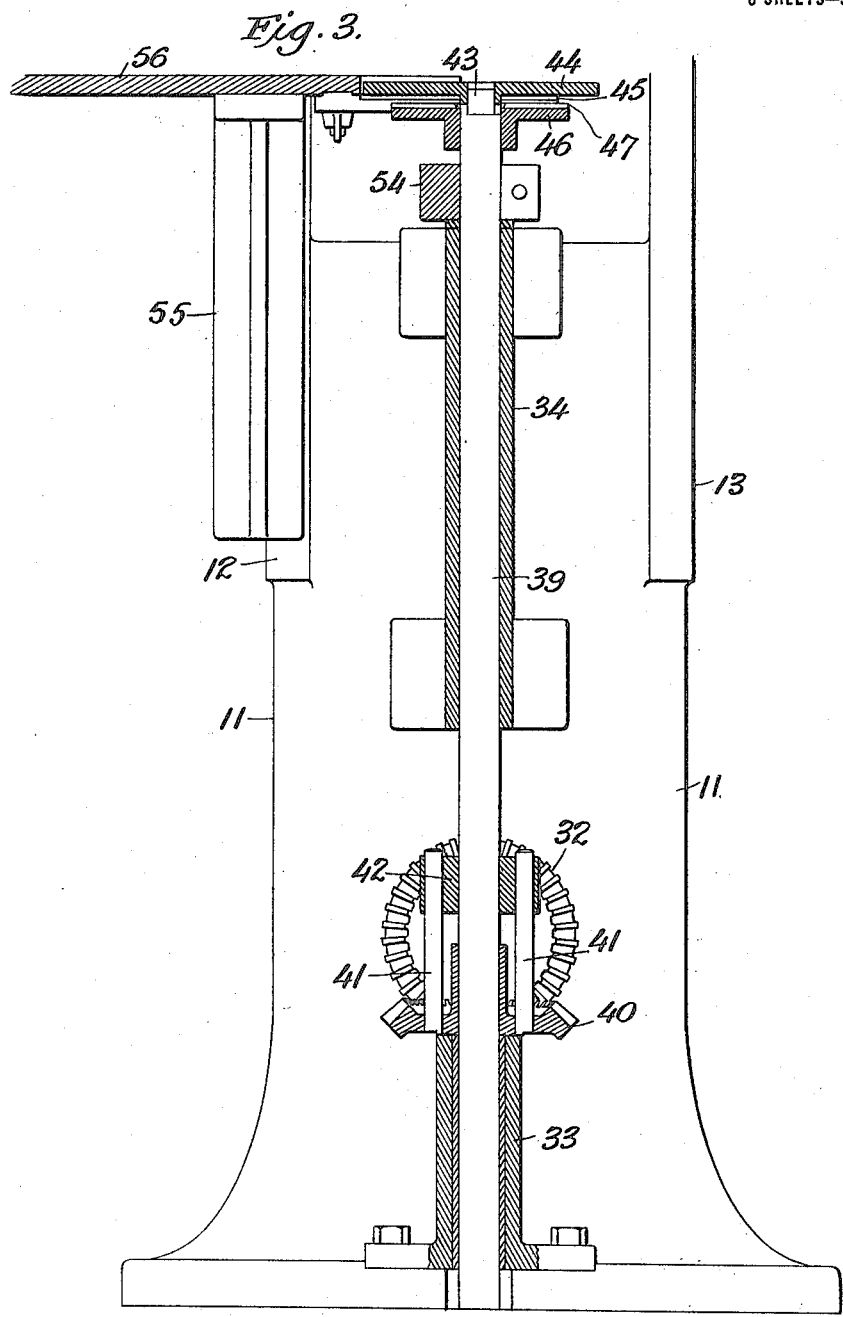
Figure 4:
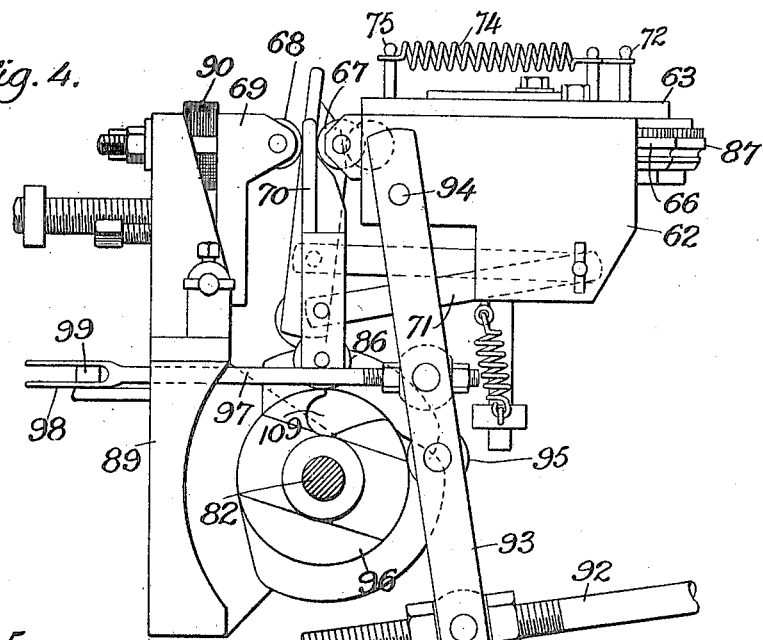
Figure 5:
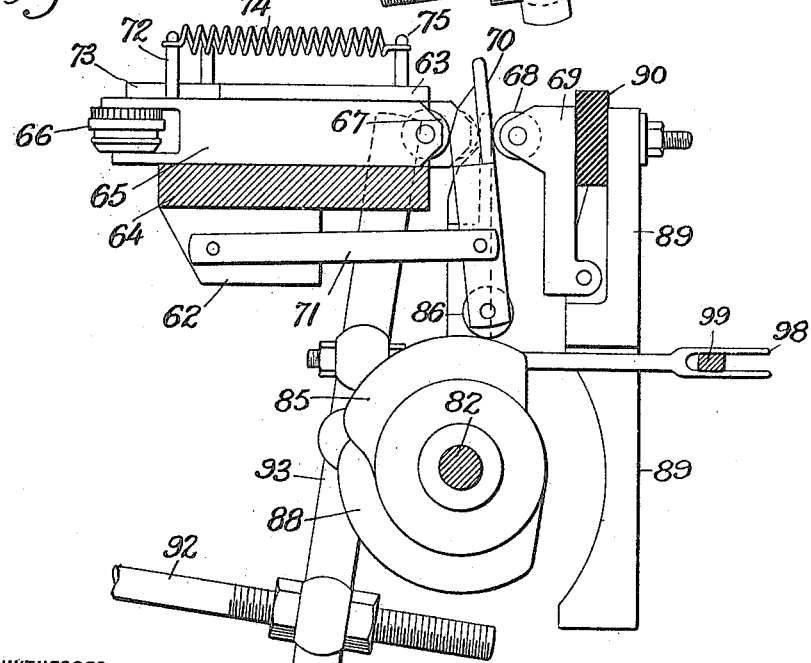
Figure 6:
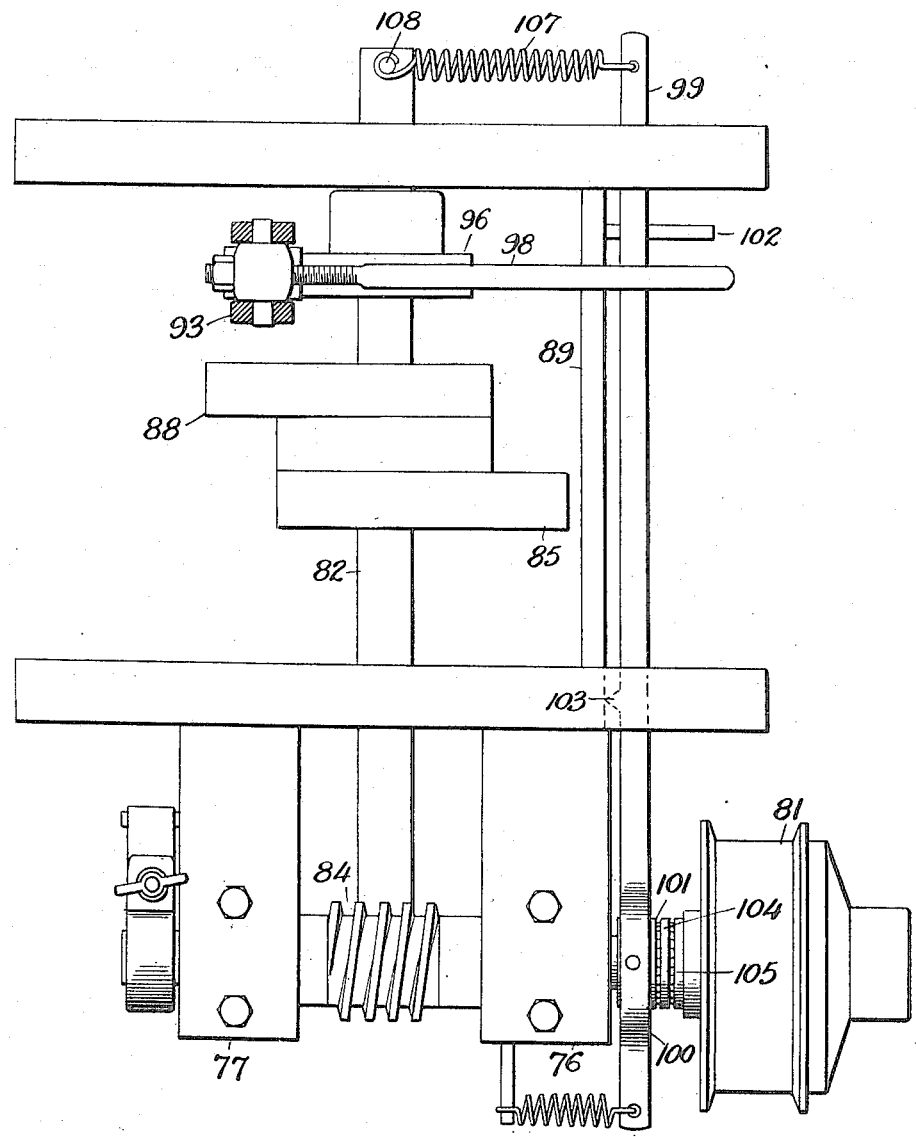
Figure 7:
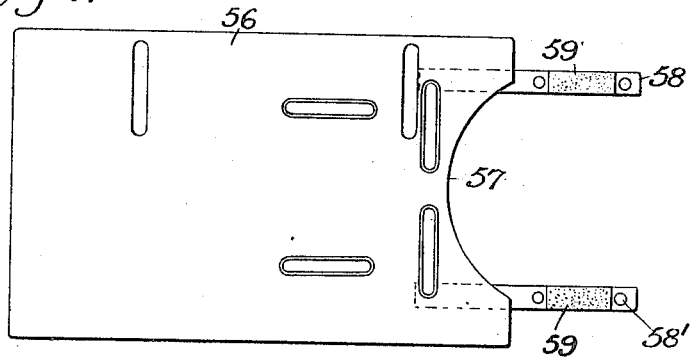
Figure 8:
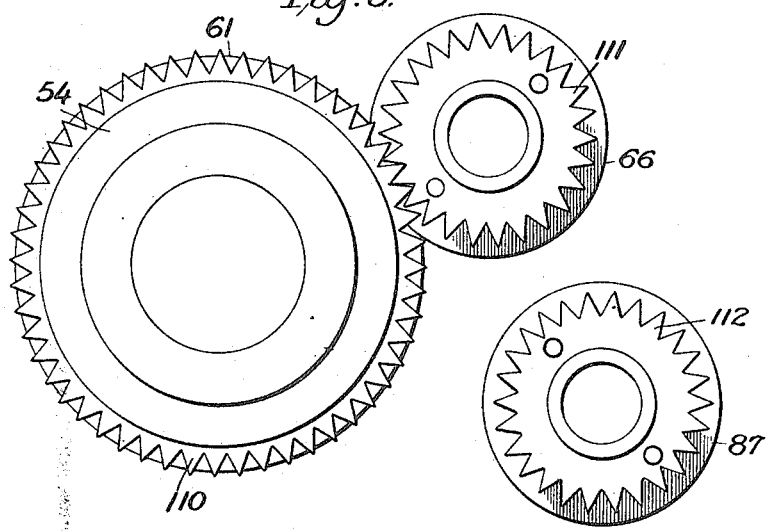
Figure 9:
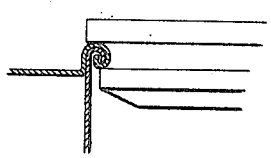
Figure 10:
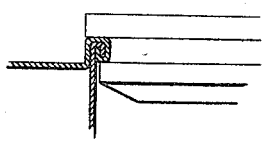

Figure 1 is a front elevation of the machine embodying my invention; Fig. 2 is a side elevation thereof; Fig. 3 is an enlarged partly sectional view of the lower portion of Fig. 1; Fig. 4 is an enlarged side elevation of the mechanism for actuating one of the seaming rollers, as the same would appear from the side opposite to that shown in Fig. 2, with the supporting frame removed; Fig. 5 is a similar view of the other side of the parts shown in Fig. 4; Fig. 6 is a top plan view of the mechanism shown in Figs. 4 and 5; Fig. 7 is a plan view of the can-feeding platform; Fig. 8 is a detail view of the intermittently intergeared chuck and seaming rollers; Fig. 9 is a detail showing operation of one of the rollers, and Fig. 10 is a similar view showing operation of the other roller.

Referring now to the drawings in detail, numeral 11 refers to a heavy supporting standard, secured to or integral with which are the lower ends of the arms 12 and 13 of an inverted U-shaped frame, the whole comprising the main supporting frame of the machine. Suitably journaled in the lower portion of the standard 11 and in the smaller standard 14 which is preferably mounted on the same base-plate, is the main driving shaft 15 carrying the driving pulley 16 to which power is applied from any suitable source. A loose pulley 17 and adjacent fast pulley 16, in connection with a suitable belt-shifter 18 controlled by the lever 19, serve to start and stop rotation of said driving shaft in a common and well-known manner.

Mounted upon or integral with the upper end of the inverted U-shaped member of the supporting frame, is the bracket 20 having forwardly projecting arms 21 and 22 with journal boxes 23 and 24, respectively, at the ends thereof. In these boxes 23 and 24, is journaled the vertical shaft 25 carrying the driving pulley 26 mounted between the arms 21 and 22. The main driving shaft 15 is provided with a pulley 27, of the same size as the pulley 26 and therefore driving the latter at the same velocity through the medium of the belt 28 which passes over idlers 29 and 30, suitably journaled in the rearwardly projecting arms 31 of the bracket 20, and around the pulley 26.

The main driving shaft 15 extends through the standard 11 and projects in front thereof, where it is provided with a bevel gear 32. Supported and having bearings in the sleeve or socket 33 on the base of the frame, and in the sleeve 34 which has slide bearings in the heads 35 and 36 of the arms 37 and 38, respectively, is the vertical shaft 39. Loosely mounted on said shaft 39 and rotatively supported by the top of the sleeve 33, is the bevel gear 40 in mesh with the gear 32 on the shaft 15. The gear 40 is provided with upwardly projecting pins 41 41 which enter suitable apertures in the disk or drum 42 which is fixed upon the shaft 39. It will be apparent that this construction and arrangement provides for the vertical reciprocation of the shaft 39 during or independent of rotation of said shaft through the gears 32 and 40. These gears are identical, and it will therefore be seen that the shafts 25 and 39, which are in alinement, are rotated in the same direction and at the same velocity by rotation of the shaft 15.

The top of the shaft 39 is reduced in diameter to form an axle 43 centrally journaled and slidable upon which is the preferably circular disk or platform 44. This disk 44 has a lower facing 45 of leather, or other material providing a friction surface, and upon raising the shaft 39 said plate rests upon the disk 46 fixed to the end of said shaft, said disk 46 being correspondingly provided with an upper friction facing 47.

The sleeve 34 is vertically reciprocated by means of an accessible yoke-shaped hand-lever 48 fulcrumed at 49 to the head 36 and serving through links 50 50, pivoted to the rear ends of the arms of said lever and to opposite sides of a collar 51 on said sleeve, to raise said collar and therewith said sleeve upon depression of said lever, these parts being returned to normal positions by means of coil-springs 52 52 in tension between hooks 53 53 on the head 35 and the ends of the arms of said lever. It will be apparent that when through operation of said lever said sleeve 34 is raised, the upper end thereof will contact with the collar 54 fixed on the shaft 39 and raise the latter vertically independent of its rotation.

Suitably secured to the arm 12 of the U-shaped frame, or otherwise to this side of the main supporting frame, is the bracket 55 carrying the plate 56, one end of which projects beyond the edge of the disk 44 but which is provided with a recessed portion 57 to provide for the raising and lowering of said disk 44 which normally projects into and conforms to the configuration of said recess. This plate 56 is designed to provide a table or platform upon which the cans to be seamed may be placed, and this plate is recessed for the disk 44 in order to facilitate the feeding of the can-bodies from said table or platform to said disk. Secured to the under side of the plate 56 are the projecting arms 58 and 58' which pass under opposite edges of the disk 44. These arms 58 and 58' normally support said disk at said opposite edges.

The disk 46 fixed at the top of the shaft 39, being provided with an upper facing 47 of leather or friction-board, it will be apparent that when the rotating shaft 39 is raised, in the manner heretofore described, the faced upper side of the disk 46 will contact with the faced lower side of the disk 44 and lift the latter from the supporting arms 58 and 58'. When the shaft 39 is lowered, the disk 44 will be lowered therewith until again engaged and supported by the arms 58 and 58', the shaft 39 continuing its downward movement through a slight distance, the upper sides of the arms 58 and 58' being provided with friction facing-strips 59 of leather or other suitable material.

The disk 44 is designed to receive and assist in the support of the can to be headed. When this can is delivered thereto, the shaft 39 is in its depressed position and being rotated in the manner described, but the disk 44 is supported upon the arms 58 and 58' and is, therefore, at rest. When said shaft 39 is raised, the friction facing 47, which is rotating with the disk 46 on the shaft 39, will contact with the friction facing 45 on the lower side of the disk 44, and in raising said disk gradually but positively start the rotation of said disk, the velocity of which is rapidly increased until said disk is rotating in unison with said shaft. As this shaft 39 is depressed, the facings 59 on the arms 58 and 58' will receive the facing 45 on the disk 44 and tend to rapidly and steadily bring the rotating disk to a condition of rest. It will be noted that during all of these operations the shaft 39 is continuously rotating.

At the lower end of the shaft 25 is mounted the head or other support 60 for the usual chuck 61 which is shaped and positioned to enter and snugly fit the usual countersink or depression therefor in the can-cover and suitably support the latter through the can-body against the reacting forces of the double-seaming operation. When a can-body is properly positioned upon the disk or platform 44, with said platform in its normal or lowered position, the chuck 61 is located far enough above the top of the can-body to permit of the ready placing and adjustment of said body on said platform and yet so close to the top of said body that when said platform is raised in the manner described, the can-body with its top thereon will be firmly clamped between the platform and chuck before the inertia of said platform has been frictionally overcome by its substitute support 46 which is rotating with the shaft 39. Therefore, it will be seen that a filled can with its top or cover loosely placed thereon may be adjusted upon a stationary platform and then simultaneously raised and subjected to forces yieldingly tending to rotate the same, the latter, however, not becoming effective until said top or cover has been firmly seated and held in its seat by the pressure of the chuck 61. Therefore, portions of the contents of the can will not be expelled by centrifugal action, yet immediately upon the application of compressive forces, the can-body will be rapidly rotated, by the chuck and platform, both of which are positively rotated in the same direction at uniform velocities.

The seaming operation is designed to be effected by a pair of seaming rollers which are alternately brought into coöperative relation to the chuck 61. This chuck 61 laterally supports two layers of metal—one the flange which has been formed on the upper edge of the can-body, and the other the edge of the cover which is superposed on said flange. The first seaming roller operates to roll or curl the superposed edges together, and the other seaming roller compresses and completes the seam.

For reasons hereinbefore set forth, I desire that the actuating mechanism for the seaming rollers be located at or in the rear of the machine. I therefore suitably secure to the main supporting frame, a pair of plates of which one 62 is shown in Fig. 4, the other being its opposite counterpart. These plates carry the horizontal plate 63, between which and the lower plate 64 suitably secured to the plate 63, on each side, a guide-way is provided for the slide or plunger 65, having suitably journaled at its forward end the seaming roller 66. The relative arrangement or adjustment is such that the roller 66 is adapted, upon forward movement thereof, to be brought into coöperative positional relation to the working periphery of the chuck 61. At the other end of the slide 65 is provided the roller 67 between which and the roller 68 journaled in the pivoted arm 69 is interposed the reduced end-portion of a wedge 70. This wedge is retained in a proper position of adjustment by means of the rollers between which it is interposed and the brace 71 pivoted thereto and to the plate 62. The slide 65 is provided with a pin 72 in a longitudinal slot 73 in the plate 63, and a spring 74 is in tension between said pin or post 72 and a post 75 on said plate 63. This spring, therefore, tends to retain the slide 65 in its retracted and inoperative position. Suitably journaled in brackets 76 and 77 on the main supporting frame, is the shaft 78, driven from a pulley 79 on the shaft 15 and a belt 80 passing over a pulley 81 on said shaft 78.

The pulley 81 is not fixed on said shaft 78, but drives the latter through a suitable clutch mechanism hereinafter described. Positioned transversely of the shaft 78 and having suitable bearings in the main supporting frame, is the shaft 82 having fixed on one end thereof the gear 83 in mesh with the worm 84 on the shaft 78. On the shaft 82 is mounted the cam 85 in coöperative positional relation to the roller 86 at the lower end of the wedge 70. This construction and arrangement are such that said cam 85, upon rotation thereof, operates to intermittently raise and lower the wedge 70 to correspondingly reciprocate the slide 65 and the roller 66 carried thereby. The seaming roller 67 is similarly mounted upon a correspondingly mounted and positioned slide, and actuated in a precisely similar manner from a cam 88 on said shaft 82, said cams 85 and 88 being of such configuration and so positioned that the rollers 66 and 87 are alternately brought into coöperative positional relation to the chuck 61. In order to provide for slight irregularities in the metal which is being operated upon, each of these rollers should be yieldingly and not positively pressed against the edges being seamed. For this purpose (referring now to Figs. 4 and 5 and to the slide 65 therein shown and it being remembered that the other slide and its actuating mechanism are identical in all respects), I interpose between the pivoted arm 69 and the portion 89 of the supporting frame, a rubber or other yieldingly elastic buffer 90.

It will be apparent that the alternate or successive forward movement of the seaming rollers 66 and 87, should be automatically timed to correspond with the raising of the platform 44 and the clamping of the can-body between said platform and the chuck 61. For this purpose, I provide the lever 48—which, as will be remembered, is depressed to elevate the platform 44—with an upwardly projecting arm 91 to the end of which is pivoted one end of the rod 92. To this rod 92 is pivoted the end of the lever 93, fulcrumed at 94 to the plate 62 and provided intermediate said points with the roller 95 in coöperative positional relation to the cam 96 on the shaft 82. To this lever 93 is also pivoted the end of the rearwardly projecting arm 97, the other end of which is provided with the fork 98 to adjustably secure thereto the lever 99. This lever 99 is provided with a yoke 100 in which is pivoted the collar 101 on the shaft 78. The other end of the lever 99 is supported on the plate or bracket 102 mounted upon the portion 89 of the main frame, and said lever 99 is further provided with a boss or lug 103 serving as a fulcrum for said lever and acting against said portion 89 of the main supporting frame. The collar 101 is located contiguous to a washer 104 between which and the washer 105 are preferably interposed a series of anti-friction balls. The washer 105 lies against the loose pulley 81 and on the other side of said pulley is the disk 106 fixed upon said shaft 78. A tension spring 107 connects the other end of said lever 99 with a post 108 suitably mounted on the frame of the machine, and normally tends to clamp the loose pulley 81 tightly between the friction disk 106 and the collar 101 on said shaft 78. It will therefore be seen that under normal conditions the clutch will be effective and the shaft 78 will be rotated through said pulley 81.

The cam 96 is of such configuration that it normally holds the lever 93 in its most forward position and, therefore, permitting the lever 99 to clamp the pulley 81 upon the shaft 78 under action of the spring 107, thereby causing the rotation of said shaft and the worm 84 thereon to rotate the shaft 82 and therewith the cams 85 and 88. The cam 96 is provided, however, with the abruptly recessed portion 109, providing a pocket in which the roller 95 drops and is seated, instantly checking rotation of the shaft 82 and, therefore, operations of the cams 85 and 88, at the same time moving rearwardly the bar 97 and forcing the end of the lever 99 against the action of the spring 107 to release the clutch mechanism hereinbefore described and free the pulley 81, thereby instantly terminating the forces tending to drive the shaft 78. It will thus be seen that the shaft 82 is stopped simultaneously with the ceasing of the application of power tending to rotate the same.

It has been explained that the rod 92 is pivoted to the arm 91 of the lever 48. When an unseamed can is placed upon the platform 44, and the lever 48 is depressed to raise said can to positive contact with the chuck 61, the arm 91 on said lever to which the rod 92 is pivoted, will draw the latter in a forward direction, simultaneously withdrawing the roller 95 from its seat in the cam 96 and thus permitting of rotation of the shaft 82 and again operating through the rod 97 and the lever 99 to clamp the pulley 81 on the shaft 78 to rotate the latter and through the worm 84 the gear 83 on the shaft 82 and therewith the cams 85 and 88. It will thus be apparent that with the shaft 39 continuously rotating, the platform 44 is normally in a condition of rest and an unseamed can may be placed thereon, and upon depression of the lever 48 the platform 44 is raised, the first effect of which will be to start rotation of said platform as explained, until the can thereon is firmly gripped between the chuck 61 and said platform. Depression of said lever 48 also effects, in the manner explained, successive operations of the cams 85 and 88, successively raising the wedges 70 and 110 to first bring the seaming roller 66 into coöperative relation to the chuck 61, and roll or curl the superposed edges of can material, and then similarly force the roller 87 into coöperative relation to said chuck 61 to compress the rolled or curled layers into a tight and rigid joint.

In order to insure pure rolling contact between the working periphery of the chuck 61 and the working peripheries of each of the rollers 66 and 67, I provide the head 60 of said chuck with the gear 110 and the rollers 66 and 87 with gears 111 and 112 adapted, respectively, to mesh with the gear 110 on the chuck 61 brought into coöperative relation thereto. It will be obvious that with the employment of these gears there can be no lost motion due to inertia, the peripherial velocities of chuck and each of the seaming rollers remaining identical throughout the duration of coöperative relation.

The desirability of exerting a yielding pressure through each of the seaming rollers 66 and 67 against the chuck 61, has been explained. For the same reasons, and others, it is desirable that the platform 44 be similarly yieldingly pressed in the direction of the chuck 61 to grip the can-body therebetween. Therefore, instead of fixing the collar 51 to the sleeve 34, I mount this collar loosely upon said sleeve and provide the collar 114 fixed to the sleeve 34, between which and the collar 51 are suitably interposed the yielding buffers 115, of soft rubber or other suitable material. It will now be seen that the force supplied through the lever 48 to raise the sleeve 34 and therewith the shaft 39, is yieldingly and not positively applied, whereby an element is provided to compensate for irregularities in the metal in the body being operated upon and slight variations in the heights of the cans.

Many modifications of minor details of my improved can heading machine will doubtless readily suggest themselves to those skilled in the art to which it appertains, and I therefore do not desire to limit my invention to the specific construction herein shown and described.

I claim as new and desire to secure by Letters Patent:

1. In a can heading machine, the combination, with means including a chuck for supporting and rotating the assembled parts of a can to be headed, of a normally inert seaming roller, means for intermittently advancing and retracting said roller into and from work-engaging position, and means for establishing a positively intergeared connection between said chuck and said roller to rotate the latter when advanced.

2. In a can heading machine, the combination, with a rotating chuck, a rotatable can-supporting platform, and means for intermittently establishing a coöperative relation therebetween to engage the assembled parts of the can to be headed and sustain said parts against the forces of the seaming operation, of a normally inert seaming roller, means for advancing and retracting said roller into and from work-engaging position, and means for establishing a positively intergeared connection between said chuck and said roller to rotate the latter when advanced.

3. In a can heading machine, the combination, with means for supporting and rotating the assembled parts of a can to be headed, of a plurality of normally inert seaming rollers, means for intermittently advancing and retracting said rollers successively into and from work-engaging positions, and means for establishing a positively intergeared connection between said chuck and each roller in turn as the latter is advanced.

4. In a can heading machine, the combination, with a rotating chuck, a rotatable can-supporting platform, and means for intermittently establishing a coöperative relation therebetween to engage the assembled parts of the can to be headed and sustain said parts against the forces of the seaming operation, of a plurality of normally inert seaming rollers, means for advancing and retracting said rollers successively into and from work-engaging positions, and means for establishing a positively intergeared connection between said chuck and each roller in turn as the latter is advanced to work-engaging position.

5. In a can heading machine, the combination, with a rotating chuck, a rotatable can-supporting platform, and means for yieldingly rotating said platform at the same velocity as said chuck, of a normally inert seaming roller, means for intermittently advancing and retracting said roller into and from work-engaging position, and means for establishing a positively intergeared connection between said chuck and said roller to rotate the latter when advanced.

6. In a can heading machine, the combination, with a rotating chuck, a rotatable can-supporting platform, and means for yieldingly rotating said platform at the same velocity as said chuck, of a plurality of normally inert seaming rollers, means for intermittently advancing and retracting said rollers successively into and from work-engaging positions, and means for establishing a positively intergeared connection between said chuck and each roller in turn as the latter is advanced.

7. In a can heading machine, the combination, with a rotating chuck, a rotatable can-supporting platform, and means for raising said platform and thereby yieldingly imparting rotary movement thereto at the same velocity as said chuck, of a normally inert seaming roller, means for advancing and retracting said roller into and from work-engaging position, and means for establishing a positively intergeared connection between said chuck and said roller to rotate the latter when advanced.

8. In a can heading machine, the combination, with a rotating chuck, a rotatable can-supporting platform, and means for raising said platform and thereby yieldingly imparting rotary movement thereto at the same velocity as said chuck, of a plurality of normally inert seaming rollers, means for advancing and retracting said rollers successively into and from work-engaging positions, and means for establishing a positively intergeared connection between said chuck and each roller in turn to rotate the latter when advanced.

9. In a can heading machine, the combination, with a rotating chuck, a normally inert can-supporting platform, and means for raising said platform and thereby yieldingly imparting rotary movement thereto at the same velocity as said chuck, of a normally inert seaming roller, means actuation of which is controlled by said first-mentioned means for advancing and retracting said roller into and from work-engaging position, and means for establishing a positively intergeared connection between said chuck and said roller to rotate the latter when advanced.

10. In a can heading machine, the combination, with a rotating chuck, a rotatable can-supporting platform, and means raising said platform and thereby yieldingly imparting rotary movement thereto at the same velocity as said chuck, of a plurality of normally inert seaming rollers, means actuation of which is controlled by said first-mentioned means for advancing and retracting said rollers successively into and from work-engaging positions, and means for establishing a positively intergeared connection between said chuck and each roller in turn to rotate the latter when advanced.

11. In a can heading machine, the combination, with a rotating chuck and a rotatable can-supporting platform, of a normally inert seaming roller, said chuck and said roller each having a toothed gear rigidly associated therewith, and means for intermittently advancing and retracting said roller into and from work-engaging position, thereby establishing an intermeshed relationship between said gears when said roller has been advanced.

12. In a can heading machine, the combination, with a rotating chuck and a rotatable can-supporting platform, of a plurality of normally inert seaming rollers, said chuck and each of said rollers having a toothed gear rigidly associated therewith, and means for intermittently advancing and retracting each roller in turn into and from work-engaging position, thereby establishing an intermeshed relationship between the chuck-gear and the gear of each roller as the latter is advanced.

13. In a can heading machine, the combination, with a rotating chuck, a rotatable can-supporting platform, and means for raising said platform and thereby yieldingly imparting rotary movement thereto at the same velocity as said chuck, of a normally inert seaming roller, said chuck and said roller each having a toothed gear rigidly associated therewith, and means actuation of which is controlled by said first-mentioned means for intermittently advancing and retracting said roller into and from work-engaging position, thereby establishing an intermeshed relationship between said gears when said roller has been advanced.

14. In a can heading machine, the combination, with a rotating chuck, a rotatable can-supporting platform, and means for raising said platform and thereby yieldingly imparting rotary movement thereto at the same velocity as said chuck, of a plurality of normally inert seaming rollers, said chuck and each of said rollers having a toothed gear rigidly associated therewith, and means actuation of which is controlled by said first-mentioned means for intermittently advancing and retracting each roller in turn into and from work-engaging position, thereby establishing an intermeshed relationship between the chuck-gear and the gear of each roller as the same is advanced.

In testimony of the foregoing, I have hereunto set my hand in the presence of two witnesses.

JULIUS BRENZINGER.

Witnesses:
T. E. WEEMS,
L. R. WATKYNS.